US009712941B2

(12) United States Patent
Choi et al.

(10) Patent No.: US 9,712,941 B2
(45) Date of Patent: Jul. 18, 2017

(54) METHOD AND APPARATUS FOR PROVIDING APPLICATION SERVICE IN A MOBILE COMMUNICATION SYSTEM

(75) Inventors: Yoon-Il Choi, Yongin-si (KR); Young-Ky Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 878 days.

(21) Appl. No.: 13/641,090

(22) PCT Filed: Apr. 14, 2011

(86) PCT No.: PCT/KR2011/002673
§ 371 (c)(1),
(2), (4) Date: Oct. 12, 2012

(87) PCT Pub. No.: WO2011/129635
PCT Pub. Date: Oct. 20, 2011

(65) Prior Publication Data
US 2013/0029719 A1    Jan. 31, 2013

(30) Foreign Application Priority Data

Apr. 14, 2010    (KR) .................. 10-2010-0034162

(51) Int. Cl.
*H04W 4/00*        (2009.01)
*H04W 36/00*       (2009.01)

(52) U.S. Cl.
CPC ........... *H04W 4/001* (2013.01); *H04W 4/003* (2013.01); *H04W 36/0033* (2013.01)

(58) Field of Classification Search
USPC ....................................................... 455/525
See application file for complete search history.

(56) References Cited

U.S. PATENT DOCUMENTS 5,384,826 A * 1/1995 Amitay ................... 455/436
5,720,455 A   2/1998 Klemanski et al.
(Continued)

FOREIGN PATENT DOCUMENTS

KR    10-2003-0026682       4/2003
KR    EP2031923 A2 *  4/2005  ............ H04W 36/26
(Continued)

OTHER PUBLICATIONS

Lamberti, Fabrizio, and Andrea Sanna. "A streaming-based solution for remote visualization of 3D graphics on mobile devices." Visualization and Computer Graphics, IEEE Transactions on 13.2 (2007): 247-260.*
(Continued)

*Primary Examiner* — Ankur Jain
*Assistant Examiner* — Zhitong Chen

(57) ABSTRACT

The present invention relates to a method and apparatus for providing application service in a mobile communication system. A method in which a base station provides application service comprises: a step of receiving a request for application service from a mobile terminal; and a step of providing the mobile terminal with the requested application service on the basis of application service information pre-stored in the base station and/or application service information received from an application server, in accordance with whether or not the application service information corresponding to the requested application service is pre-stored in the base station.

10 Claims, 9 Drawing Sheets

(56) References Cited

U.S. PATENT DOCUMENTS

| | | |
|---|---|---|
| 5,738,311 A | 4/1998 | Fernandez |
| 5,740,547 A | 4/1998 | Kull et al. |
| 5,785,392 A | 7/1998 | Hart |
| 5,813,635 A | 9/1998 | Fernandez |
| 5,820,226 A | 10/1998 | Hart |
| 5,833,325 A | 11/1998 | Hart |
| 5,927,822 A | 7/1999 | Hart |
| 5,934,764 A | 8/1999 | Dimsa et al. |
| 5,950,967 A | 9/1999 | Montgomery |
| 5,969,643 A | 10/1999 | Curtis |
| 5,978,718 A | 11/1999 | Kull |
| 5,986,577 A | 11/1999 | Bezos |
| 5,986,579 A | 11/1999 | Halvorson |
| 5,995,881 A | 11/1999 | Kull |
| 6,114,974 A | 9/2000 | Halvorson |
| 6,128,558 A | 10/2000 | Kernwein |
| 6,163,089 A | 12/2000 | Kull |
| 6,216,095 B1 | 4/2001 | Glista |
| 6,275,165 B1 | 8/2001 | Bezos |
| 6,322,025 B1 | 11/2001 | Colbert et al. |
| 6,360,998 B1 | 3/2002 | Halvorson et al. |
| 6,377,215 B1 | 4/2002 | Halvorson et al. |
| 6,782,044 B1 | 8/2004 | Wright et al. |
| 6,941,338 B1 * | 9/2005 | Madsen ............ G06F 17/30902 370/336 |
| 7,221,370 B1 * | 5/2007 | Arnold ............. G06F 17/30899 345/169 |
| 7,416,262 B2 | 8/2008 | Ring |
| 7,460,524 B2 * | 12/2008 | Khan ........................... 370/353 |
| 8,157,218 B2 | 4/2012 | Riley et al. |
| 8,428,798 B2 | 4/2013 | Kull |
| 2002/0076054 A1 * | 6/2002 | Fukutomi et al. ............ 380/277 |
| 2005/0121971 A1 | 6/2005 | Ring |
| 2005/0239465 A1 | 10/2005 | Lee et al. |
| 2009/0131031 A1 * | 5/2009 | Isobe ................ H04L 29/08846 455/418 |
| 2009/0213810 A1 * | 8/2009 | Shousterman et al. ....... 370/331 |
| 2009/0327908 A1 * | 12/2009 | Hayton ......................... 715/744 |

FOREIGN PATENT DOCUMENTS

| | | | |
|---|---|---|---|
| KR | 10-2005-0089627 | 9/2005 | |
| SE | WO 00/59239 | * 10/2000 | ............... H04Q 3/00 |
| WO | WO9960735 A1 | 11/1999 | |
| WO | WO2010039680 A1 | 4/2010 | |
| ZA | 200101708 A | 8/2001 | |

OTHER PUBLICATIONS

International Search Report dated Dec. 27, 2011 in connection with International Patent Application No. PCT/KR2011/002673.

* cited by examiner

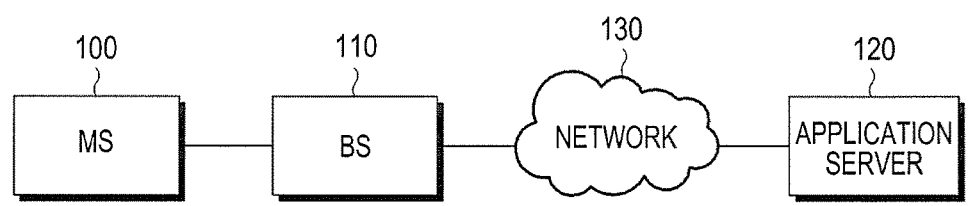
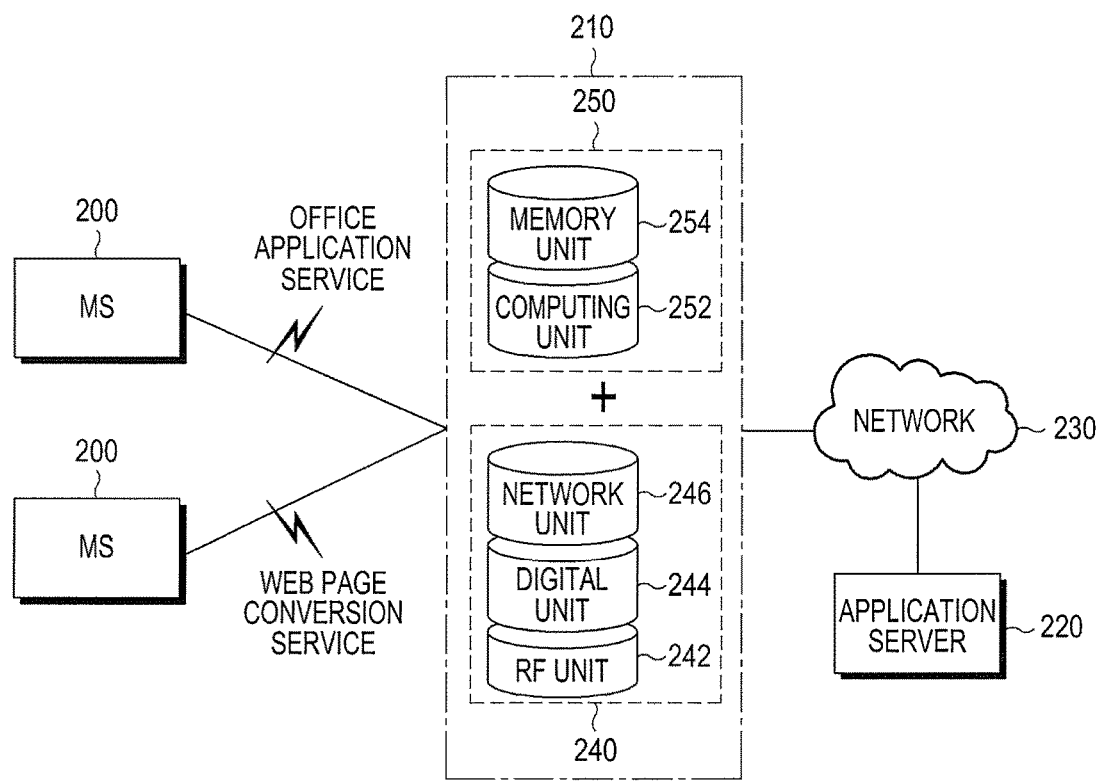

METHOD AND APPARATUS FOR PROVIDING APPLICATION SERVICE IN A MOBILE COMMUNICATION SYSTEM

CROSS-REFERENCE TO RELATED APPLICATION(S)

The present application claims priority under 35 U.S.C. §365 to International Patent Application No. PCT/KR2011/002673 filed Apr. 14, 2011, entitled "METHOD AND APPARATUS FOR ENABLING COMMUNICATION BETWEEN A MOBILE DEVICE AND UNIVERSAL PLUG AND PLAY DEVICES". International Patent Application No. PCT/KR2011/002673 claims priority under 35 U.S.C. §365 and/or 35 U.S.C. §119(a) to Korean Patent Application No. 10-2010-034162 filed Apr. 14, 2010 and which are incorporated herein by reference into the present disclosure as if fully set forth herein.

TECHNICAL FIELD

The present invention relates to a method and apparatus for providing an application service in a mobile communication system.

BACKGROUND ART

Cloud computing is a technology that enables a PC or a mobile terminal to use software through a connection to the Internet, only when needed. Cloud computing provides a consistent, reliable computerizing environment irrespective of time and place.

With reference to FIG. 1, a description will be given of the configuration of a mobile communication system to which a conventional cloud computing technology is applied.

FIG. 1 is a block diagram of a conventional mobile communication system.

Referring to FIG. 1, the mobile communication system includes a Mobile Station (MS) 100, a Base Station (110), and an application server 120. The MS 100 wirelessly communicates with the BS 110 and the BS 110 communicates with the application server 120 by cable over a network 130.

The MS 100 transmits a software request to the BS 110. Upon receipt of the software request from the MS 100, the BS 110 transmits a software request for the MS 100 to the application server 120 over the network 130.

Then the application server 120 transmits a software providing service for the MS 100 to the BS 110 so that the MS 100 may use intended software by the software providing service.

In the mobile communication system, since an MS can receive a software service from an application server, the MS does not need to be loaded with large-capacity software. Furthermore, processing power for software execution can be reduced in the MS, thereby reducing battery consumption and increasing performance.

Companies that should provide a computerizing environment can provide the same computerizing environment with low cost using an application server to which cloud computing is applied, rather than it provides software and expensive hardware to individuals. That's why cloud computing has gained more popularity.

Meanwhile, the current mobile communication system provides application services to MSs in the following two ways.

Like Web service, an application service may be provided to MSs unilaterally by an application server (this application service is referred to as a server-centered application service). On the other hand, an MS may download an execution program and data of an application service from an application server and execute the application service (this application service is referred to as a terminal-centered application service).

In the case of the server-centered application service, computing resources are mostly concentrated on the application server and traffic occurs in an end-to-end path between an MS and the application server. That is, computing power and traffic generated during communication with an MS are concentrated on the application server.

Therefore, as the number of MSs to receive the server-centered application service increases, the number of application servers to provide the service to the MSs should be increased and even when each MS is far from an application server, much traffic is often generated. In addition, more and more security and communication security services are deployed in proportion to the number of MSs.

In the case of the terminal-centered application service, an MS is required to have a memory space and computing resources. If requirements are not satisfied to a predetermined level, execution of application programs is restricted. Especially as along with the recent growth of smart phones, more and more application programs require splendid graphic images and high computing performance, conventional low-specification terminals cannot execute a large number of user-desired application programs.

DISCLOSURE

Technical Problem

An aspect of embodiments of the present invention is to address at least the problems and/or disadvantages and to provide at least the advantages described below. Accordingly, an aspect of embodiments of the present invention is to provide a method and apparatus for providing an application service in a mobile communication system.

Another aspect of embodiments of the present invention is to provide a method and apparatus for distributing computing resources and traffic used for an application service in order to overcome concentration of computing resources and traffic on an application server in a mobile communication system.

Another aspect of embodiments of the present invention is to provide a method and apparatus for enabling a low-specification MS to use various application services in a mobile communication system.

Another aspect of embodiments of the present invention is to provide a method and apparatus for enabling an MS to use a seamless application service even while the MS is moving in a mobile communication system.

A further aspect of embodiments of the present invention is to provide a method and apparatus for providing a security service based on the location of an MS in a mobile communication system.

Technical Solution

In one aspect of the present invention, there is provided a method and apparatus for providing an application service at a BS in a mobile communication system, in which an application service request is received from an MS, and a requested application service is provided to the MS based on at least one of pre-stored application service information and application service information received from an application server according to whether application service information corresponding to the requested application service is pre-stored in the BS.

In another aspect of the present invention, there is provided a method for providing an application service to an MS that performs handover in a mobile communication system, in which at least one of context information about the MS corresponding to an application service provided to the MS and information about a target BS is transmitted to at least one of an application server and the target BS by a serving BS, and the application service is provided to the MS based on the context information about the MS by the target BS.

In another aspect of the present invention, there is provided an apparatus for providing an application service in a mobile communication system, in which an RF unit communicates with an MS, a network unit communicates with an application server in a network, a memory unit stores application service information, and a controller receives an application service request from the MS and provides a requested application service to the MS based on at least one of pre-stored application service information and application service information received from the application server according to whether application service information corresponding to the requested application service is pre-stored in the memory unit.

In a further aspect of the present invention, there is provided a mobile communication system for providing an application service to an MS that performs handover, in which a target BS provides an application service to the MS, an application server provides application service information, and a serving BS transmits at least one of context information about the MS corresponding to an application service provided to the MS and information about the target BS to at least one of the application server and the target BS. The target BS provides the application service to the MS based on the context information about the MS.

Advantageous Effects

According to the present invention, even a low-specification MS can use an application service executable only in a high-specification MS through a BS. That is, MSs can receive various, new application services from a BS irrespective of their specifications. Therefore, the present invention provides a new User Experience (UE) to MSs being users of a mobile communication network and allows a mobile communication service provider to increase an Average Revenue Per User (ARPU), create profits through other services, and produce new sales by selling new BS equipment to BS manufacturers.

Additionally, the present invention distributes communication load and computing load in providing on-line service to tens of thousands to millions of MSs. Therefore, more useful application services can be provided in a cloud computing environment. Especially when application services are provided in an MS-centered manner rather than in a network-centered manner, a device at a network edge, such as a BS provides an application service. As a consequence, efficiency can be increased, compared to conventional provisioning of application services from a server.

A cloud service provider can remarkably reduce its server resources and network resources. A communication service provider that provides a network takes charge of a part of the cloud service in its communication network, thus increasing added values as a smart pipe that can provide various application services, beyond the role of a dumb pipe that provides only a connection function without a data processing capability. Further, a BS manufacturer can develop a new market in connection with services as well as it can increase competitiveness and added values of its products.

BRIEF DESCRIPTION OF THE DRAWINGS

FIG. 1 is a block diagram of a conventional mobile communication system;

FIG. 2 is a block diagram of a mobile communication system according to an embodiment of the present invention;

BEST MODE

Figure 3:
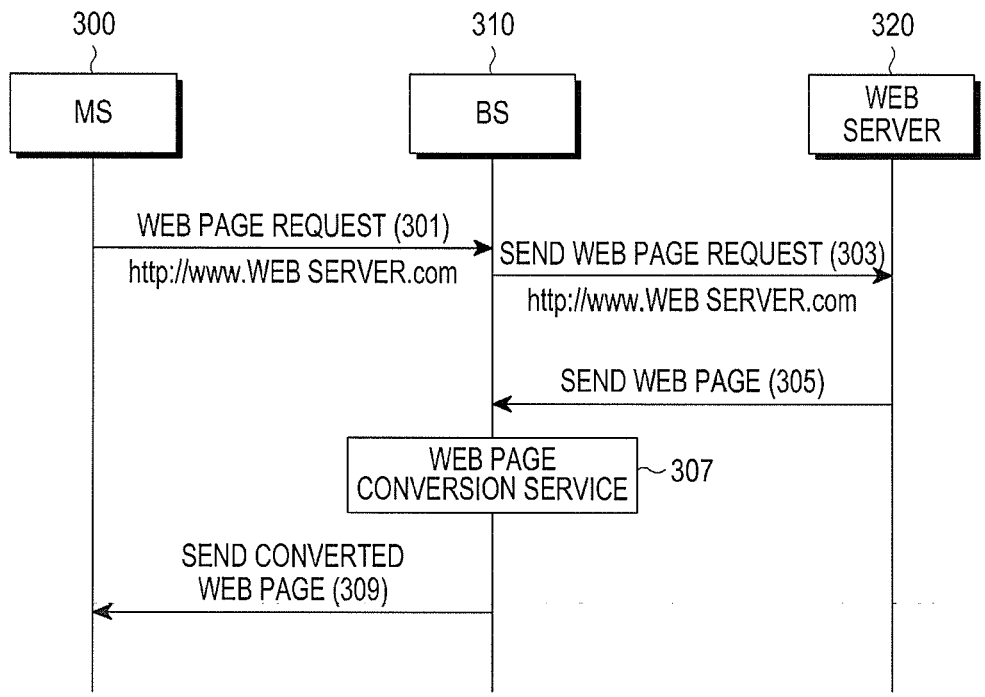
FIG. 3 is a diagram illustrating a signal flow for a Web service providing operation in the mobile communication system according to an embodiment of the present invention.

Reference will now be made in detail to the preferred embodiments of the present invention with reference to the accompanying drawings. A detailed description of known functions and structures will be omitted lest it should obscure the subject matter of the present invention.

The present invention provides a method and apparatus for providing a service in a mobile communication system. More particularly, the present invention provides a method and apparatus for enabling a Base Station (BS) to provide a variety of application services to user terminals. For the convenience' sake of description, a Mobile Station (MS) is described as an exemplary user terminal. However, it is obviously to be understood that the user terminal may be any other device that communicates with a BS, such as a Personal Digital Assistant (PDA) or a netbook computer.

Now a description will be given of the configuration of a mobile communication system according to an embodiment of the present invention with reference to FIG. 2.

FIG. 2 is a block diagram of a mobile communication system according to an embodiment of the present invention.

Referring to FIG. 2, the mobile communication system includes MSs 200, a BS 210, and an application server 220. The MSs 200 wirelessly communicate with the BS 210 and the BS 210 communicates with the application server 220 by cable over a network 230.

An MS 200 transmits an application service request for an application service such as a text edit service to the BS 210 and receives the application service from the BS 210. Examples of the text edit service include an office application service and a Web page conversion service.

The application server 220 transmits information needed for providing the application service to the MS 200, such as context information, to the BS 210, or receives data that the MS 200 finally stores from the BS 210 and stores the received data.

The BS 210 provides various application services to the MSs 200. The BS 210 includes a communication module 240 for communicating with the MSs 200 and the application server 220 and a service module 250 for providing services to the MSs 200.

The communication module 240 includes a Radio Frequency (RF) unit 242 for communicating with the MSs 200, a network unit 246 for communicating with the application server 200, and a digital unit 244.

The service module 250 includes a computing unit 252 and a memory unit 254.

The computing unit 252 is a core component used to provide an application service in the BS 210. The computing unit 252 provides an application service to the MSs 200 using information and data stored in the memory unit 254. The computing unit 252 performs a service distribution function and a virtual terminal function. Later-described operations of the BS 210 may be performed by the computing unit 252 and the computing unit 252 may be implemented into a controller for providing overall control to the BS 210.

The memory unit 254 functions as a cache memory for temporarily storing traffic and messages that are generated while the MSs 200 are using an application service. The memory unit 254 also functions as a storage for storing data generated from the MSs 200 during an application service in progress.

The memory unit 254 may also store application programs and data used for the BS 210 to provide a number of application services to the MSs 200 and may store an Application Programming Interface (API) needed for developing an application service within the BS 210 or for providing a mash-up service using a service of the BS 210.

The BS 210 having the above-described configuration can distribute computing resources and traffic concentrated on the application server 220, provide the virtual terminal function to low-specification MSs, and enable an MS to use a seamless service even during movement. In addition, the BS 210 provides a security service based on the location of an MS and enables development of various application services by providing an open API. The operations of the BS 210 that provide the above functions will be described in detail, largely in five categories.

1. Service Distribution

In a service distribution method according to an embodiment of the present invention, computing resources and traffic used for an application service are distributed in order to overcome the problem of concentration of computing resources and traffic on an application server in a mobile communication system.

In accordance with the embodiment of the present invention, communication load between an MS and an application server can be reduced as well as computing power of the application server is distributed, by enabling a BS to provide an application service instead of the application server.

For example, in the case of an application service that provides a text edit program, whenever an MS executes the text edit program and edits text, traffic is continuously generated. A BS temporarily stores the traffic and upon generation of an event such as save file at the MS, the BS transmits only an edit result to the application server in the embodiment of the present invention.

In this manner, the BS can offload frequent traffic load generated at the MS from the application server.

Meanwhile, security needs to be ensured for communication between MSs and the application server. Computation requiring high processing performance, like encryption, is concentrated on the application server. If an application service is used through a BS as in the embodiment of the present invention, the amount of traffic transmitted to the application server can be reduced, thereby remarkably mitigating the performance requirement for encryption. Since the BS basically performs a security function for the air interface, no performance and function requirements for additional security are generated.

If the BS manages software for an application service on its own, it may store and manage context information for the application service directly.

Conventionally, for example, when an MS uses a cloud service, a cloud server as an application server should execute application program instances one by one for individual MSs and store and manage per-instance contexts. As a result, as the number of MSs is increased, more processing power is required and resources needed for services, that is, the number of servers and memory space should be increased in proportion to the number of MSs.

In contrast, when a BS provides an application service as in the embodiment of the present invention, the BS executes a necessary application program instance for each MS and stores per-instance contexts. Therefore, the load of the cloud server can be reduced significantly. In addition, the cloud server should store and manage the profiles and user log-in states of individual MSs that use services. If the BS takes over this function from the cloud server, the load of the cloud server can be reduced.

With reference to FIG. 3, an operation for providing a Web service in the mobile communication system according to an embodiment of the present invention will be described below.

FIG. 3 is a diagram illustrating a signal flow for a Web service providing operation in the mobile communication system according to an embodiment of the present invention.

Referring to FIG. 3, an MS 300 transmits a Web page request to a BS 310 using a Uniform Resource Locator (URL) (e.g. http://www.웹서버.com) in step 301. Then the BS 310 transmits the Web page request along with the URL to a Web server 320 in step 303.

In step 305, the Web server 320 transmits a Web page corresponding to the URL to the BS 310. Upon receipt of the Web page, the BS 310 converts the Web page by a Web page conversion service in step 307.

The Web page conversion service refers to a service that, when a Web page received from the Web server 320 does not match to the display standard of the MS 300, identifies the hardware profile of the MS 300 and converts the received Web page according to the display standard of the MS 300.

Upon completion of Web page conversion, the BS 310 transmits the converted Web page to the MS 300 in step 309. Thus the MS 300 can conveniently receive and use the Web page matching to its display standard.

Figure 4:
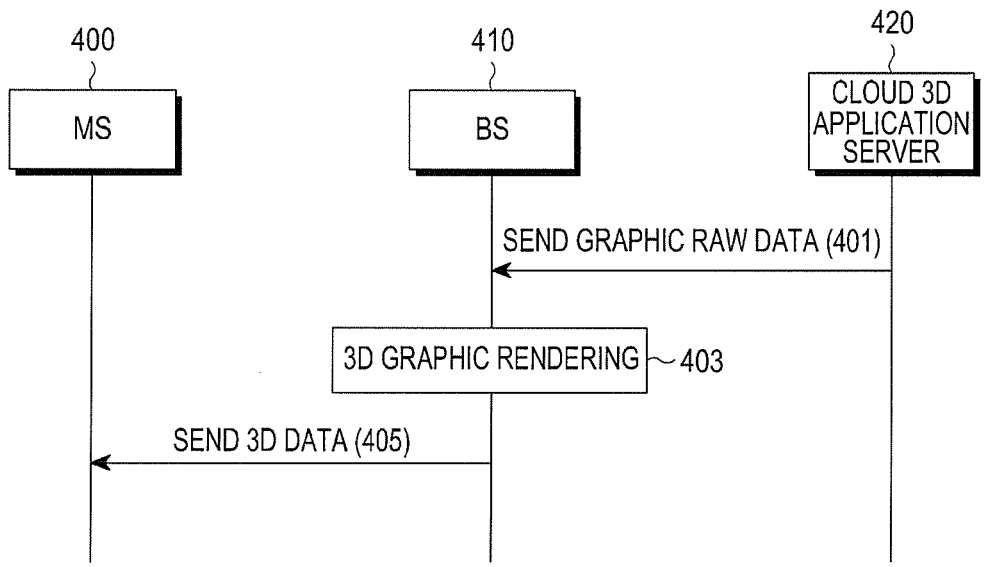
FIG. 4 is a diagram illustrating a signal flow for a three-dimensional (3D) service providing operation in the mobile communication system according to an embodiment of the present invention.

With reference to FIG. 4, a three-dimensional (3D) service providing operation in the mobile communication system according to an embodiment of the present invention will be described.

FIG. 4 is a diagram illustrating a signal flow for a 3D service providing operation in the mobile communication system according to an embodiment of the present invention.

Referring to FIG. 4, a cloud 3D application server 420 transmits graphic raw data to a BS 410 in step 401. The cloud 3D application server 420 may perform step 401 in response to a 3D service request for an MS 400 received from the BS 410 or in an unsolicited manner without receiving the 3D service request, in order to provide a 3D service to the MS 400.

Upon receipt of the graphic raw data, the BS 410 performs 3D graphic rendering using the received graphic raw data in step 403. Subsequently, when the 3D graphic rendering is completed and thus 3D data is generated, the BS 410 transmits the 3D data to the MS 400 in step 405.

Figure 5:
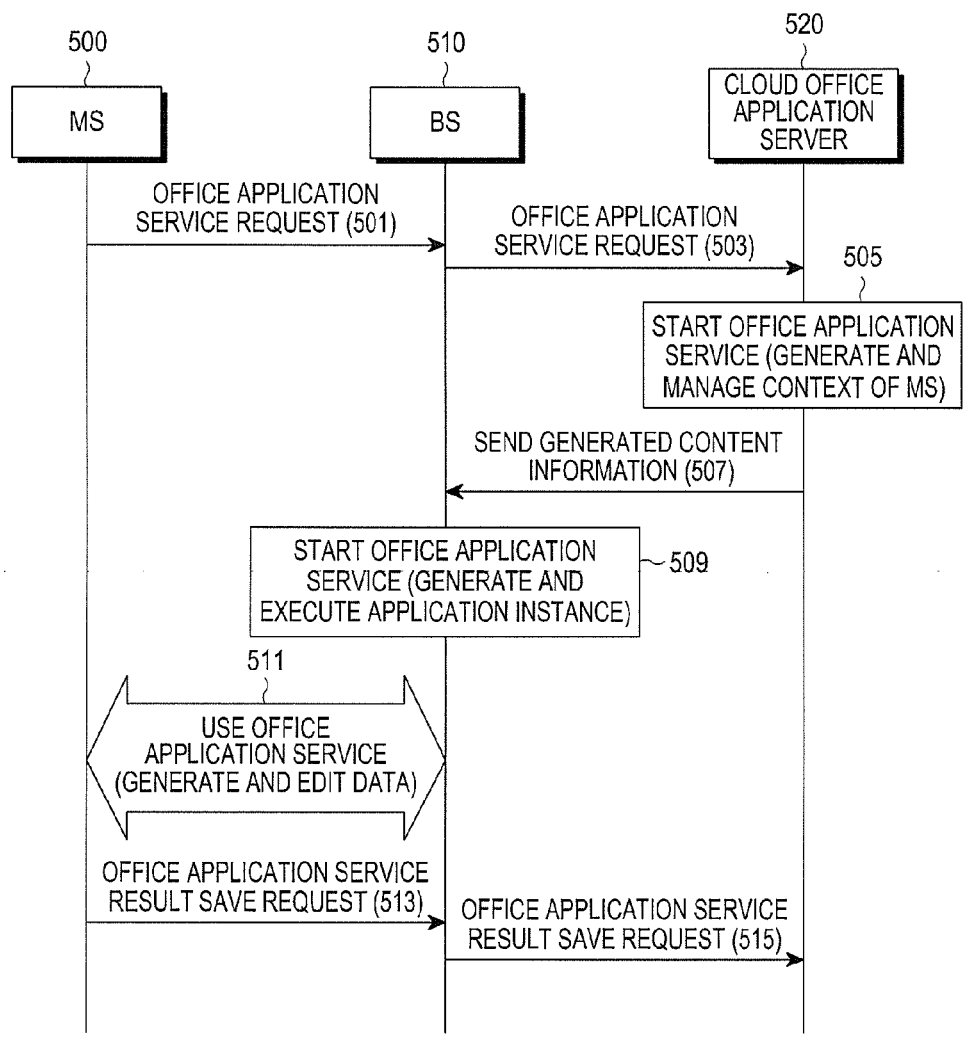
FIG. 5 is a diagram illustrating a signal flow for a text edit service providing operation in the mobile communication system according to an embodiment of the present invention.

With reference to FIG. 5, a text edit service providing operation in the mobile communication system according to an embodiment of the present invention will be described.

FIG. 5 is a diagram illustrating a signal flow for a text edit service providing operation in the mobile communication system according to an embodiment of the present invention.

Referring to FIG. 5, when an MS 500 is to use an on-line text edit program (referred to as an office program), the MS 500 requests an office application service to a BS 510 in order to use the office program in step 501.

Then the BS 510 transmits the office application service request of the MS 500 to a cloud office application server 520 in step 503.

Upon receipt of the application service request from the BS 510, the cloud office application server 520 generates and manages context information about the MS 500 by starting the office application service. The cloud office application server 520 transmits the generated context information to the BS 510 in step 507.

In step 509, the BS 510 starts the office application service using the context information and provides the office application service to the MS 500 by generating and executing an application instance for the MS 500.

The MS 500 may create or edit data using the office program that is provided through the office application service received from the BS 510.

Data and messages generated during the office application service in progress are transmitted and received only between the BS 510 and the MS 500, rather than they are transmitted to the cloud office application server 520.

However, in the case where the MS 500 requests the BS 510 to store an office application service result as in step 513, the cloud office application server 520 receives the office application service result from the BS 510 and stores the result of a final task that the MS 500 has performed in step 515.

For example, the BS 510 temporarily stores data that is generated while the MS 500 is editing text using Word. When the MS 500 selects a save menu after text editing, the result of text editing until just before selection of the save menu is transmitted to and stored in the cloud office application server 520 through the BS 510.

Meanwhile, when the MS 500 moves out of the service area of the BS 510 or is powered off during the office application service in progress, the BS 510 may transmit text that the MS 500 has edited until before interruption of the office application service to the cloud office application server 520.

Therefore, when the MS 500 uses the office application service later, it can use the office application service seamlessly, following the last text editing result.

As described above, since a BS can provide an application service to an MS, the load of an application server caused by service provisioning can be reduced and computing resources and traffic can be distributed in the embodiment of the present invention.

Meanwhile, the BS can provide a map information service or an MP3 service as well as the afore-described Web service, 3D service, and office application service.

Specifically, the BS may receive location information about an MS by Global Positioning System (GPS) and provide restaurant information and regional information within the service area of the BS to the MS. In addition, the BS can provide various services to the MS in affiliation with advertisement providers so that the MS can receive an MP3 service for free, when the MS receives advertisements.

2. Virtual Terminal Function

In accordance with an embodiment of the present invention, a BS provides a virtual terminal function so that even a low-specification MS (hereinafter, referred to as a low-specification terminal) may use various application services in the mobile communication system. The virtual terminal function is a service in which a BS functions as a high-specification MS to provide various application services to a low-specification terminal.

The BS provides, by the virtual terminal function, computing resources, memory resources, and storage resources for an application service provided in conjunction with a server in a network and a stand-alone application service of an MS.

Figure 6:
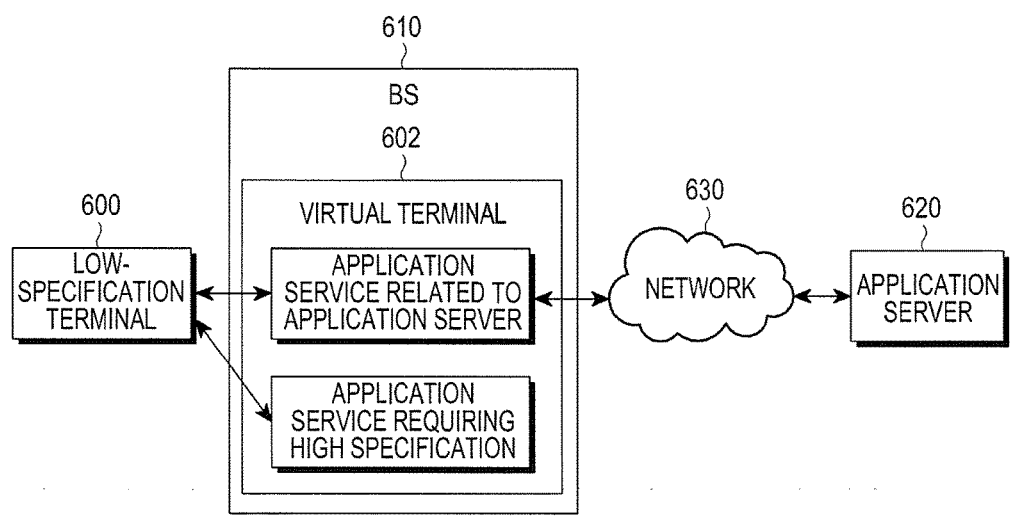
FIG. 6 is a block diagram illustrating an operation for providing an application service by a virtual terminal function in the mobile communication system according to an embodiment of the present invention.

With reference to FIG. 6, an operation for providing an application service by the virtual terminal function in the mobile communication system according to an embodiment of the present invention will be described below.

FIG. 6 is a block diagram illustrating an operation for providing an application service by the virtual terminal function in the mobile communication system according to an embodiment of the present invention.

Referring to FIG. 6, to receive a service from an application server 620, a low-specification terminal 600 requests an application service request to a BS 610.

The BS 610 generates a virtual terminal 602 according to an application service requested by the low-specification terminal 600. For example, if the requested application service is not available to the low-specification terminal 600, the BS 610 may create the virtual terminal 602.

The BS 610 authenticates the low-specification terminal 600 by relaying between the low-specification terminal 600 and the application server 620. That is, the BS 610 authenticates the low-specification terminal 600 to verify whether the low-specification terminal 600 is authorized to receive a service from the application server 620.

When the authentication of the low-specification terminal 600 is successful, the BS 610 activates the virtual terminal 602.

Specifically, regarding the application server 620, the BS 610 operates on behalf of the low-specification terminal 600 by means of the virtual terminal 602. Regarding the low-specification terminal 600, the BS 610 provides a service received from the application server 620 to the low-specification terminal 600 and then operates according to an input from the low-specification terminal 600. That is, the BS 610 indicates a service to the application server 620 in response to an input from the low-specification terminal 600 and executes an application service received from the application server 620 at the virtual terminal 602 so that the low-specification terminal 600 may use the application service. Herein, the low-specification terminal 600 may use the application service remotely.

Upon completion of the application service, the BS 610 terminates the virtual terminal 602.

Meanwhile, besides an application service associated with the application server 620 in the network, the low-specification terminal 600 may receive an application service requiring a high specification from the BS 610. In this case, a context of the low-specification terminal 600, an application program execution file, and data should be stored in the application server 620.

To use a service provided by the application server 620, the low-specification terminal 600 transmits an application service request to the BS 610.

If the requested application service is not available to the low-specification terminal 600 due to the low specification, the BS 610 creates the virtual terminal 602. Then the BS 610 authenticates the low-specification terminal 600 by relaying between the low-specification terminal 600 and the application server 620. That is, the BS 610 authenticates the low-specification terminal 600 to verify whether the low-specification terminal 600 is authorized to receive a service from the application server 620.

When the authentication of the low-specification terminal 600 is successful, the BS 610 downloads an application program execution file and data from the application server 620. Then the BS 610 generates and activates the virtual terminal 602.

The BS 610 provides the application service to the low-specification terminal 600 by executing the downloaded application program execution file and then operates according to an input from the low-specification terminal 600. Herein, the low-specification terminal 600 may use the application service remotely.

As described before, since a BS provides the virtual terminal function, even a low-specification terminal can use various, high-quality application services in the embodiment of the present invention.

3. Support of MS Mobility

In accordance with an embodiment of the present invention, an MS can continuously use an application service even during movement in the mobile communication system.

For instance, when an MS performs handover to a target BS while receiving an application service from a serving BS, the serving BS should allow the MS to continuously use the application service even though the MS is moving.

Figure 7:
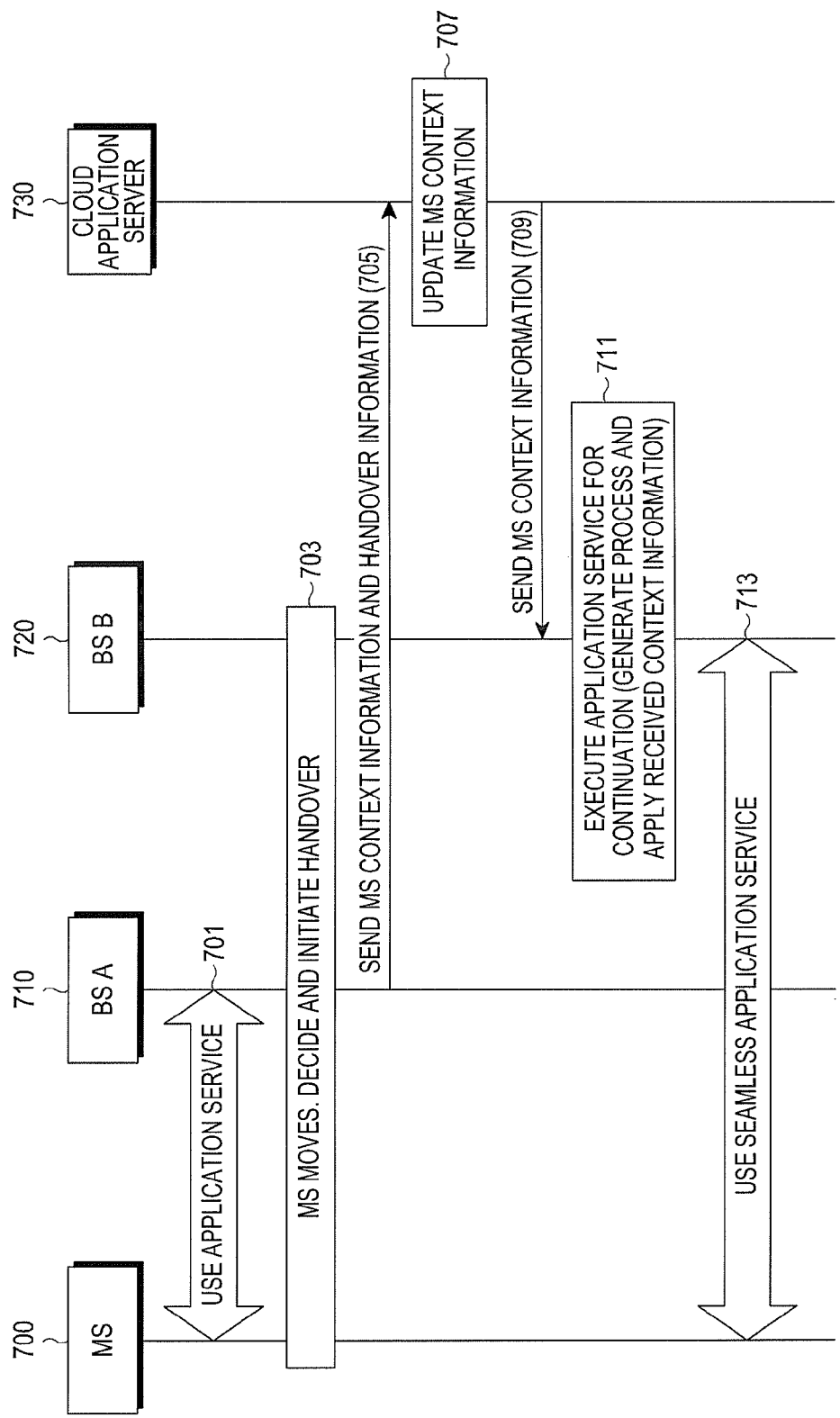
FIG. 7 is a diagram illustrating a signal flow for an operation for providing a service by transmitting context information to an application server during handover of a Mobile Station (MS) in the mobile communication system according to an embodiment of the present invention.

With reference to FIG. 7, a description will be given of an operation for providing a service by transmitting context information to an application server during handover of an MS in the mobile communication system according to an embodiment of the present invention.

FIG. 7 is a diagram illustrating a signal flow for an operation for providing a service by transmitting context information to an application server during handover of an MS in the mobile communication system according to an embodiment of the present invention.

Referring to FIG. 7, an MS 700 uses an application service received from a BS 710 (BS A) acting as a serving BS in step 701.

When the MS 700 moves from the service area of BS A to the service area of a BS 720 (BS B), BS A decides on handover of the MS 700 to BS B and initiates a handover operation in step 703.

BS A stores traffic and messages related to the application service, generated so far from the MS 700 as context information about the MS 700. In step 705, BS A transmits the context information about the MS 700 and handover information to a cloud application server 730.

That is, BS A provides the cloud application server 730 with the context information about the MS 700 and information about BS B that will provide the application service to the MS 700, so that the MS 700 may use the application service continuously.

Then the cloud application server 730 receives the application service context information and updates previous context information about the MS 700 with the received context information in step 707. As described before with reference to FIG. 5, the previous context information about the MS 700 is the context information about the MS 700, generated when the cloud application server 730 starts the application service.

The cloud application server 730 detects information about a target BS, that is, BS B in the received handover information. The cloud application server 730 requests BS B to provide the application service to the MS 700. In step 709, the cloud application server 730 transmits the updated context information about the MS 700 to BS B.

Then BS B generates an application service instance for the MS 700 and executes the application service using the received context information about the MS 700 in step 711.

Thus, the MS 700 can continuously receive and use the same application service as previous received from BS A, from BS B in step 713.

Figure 8:
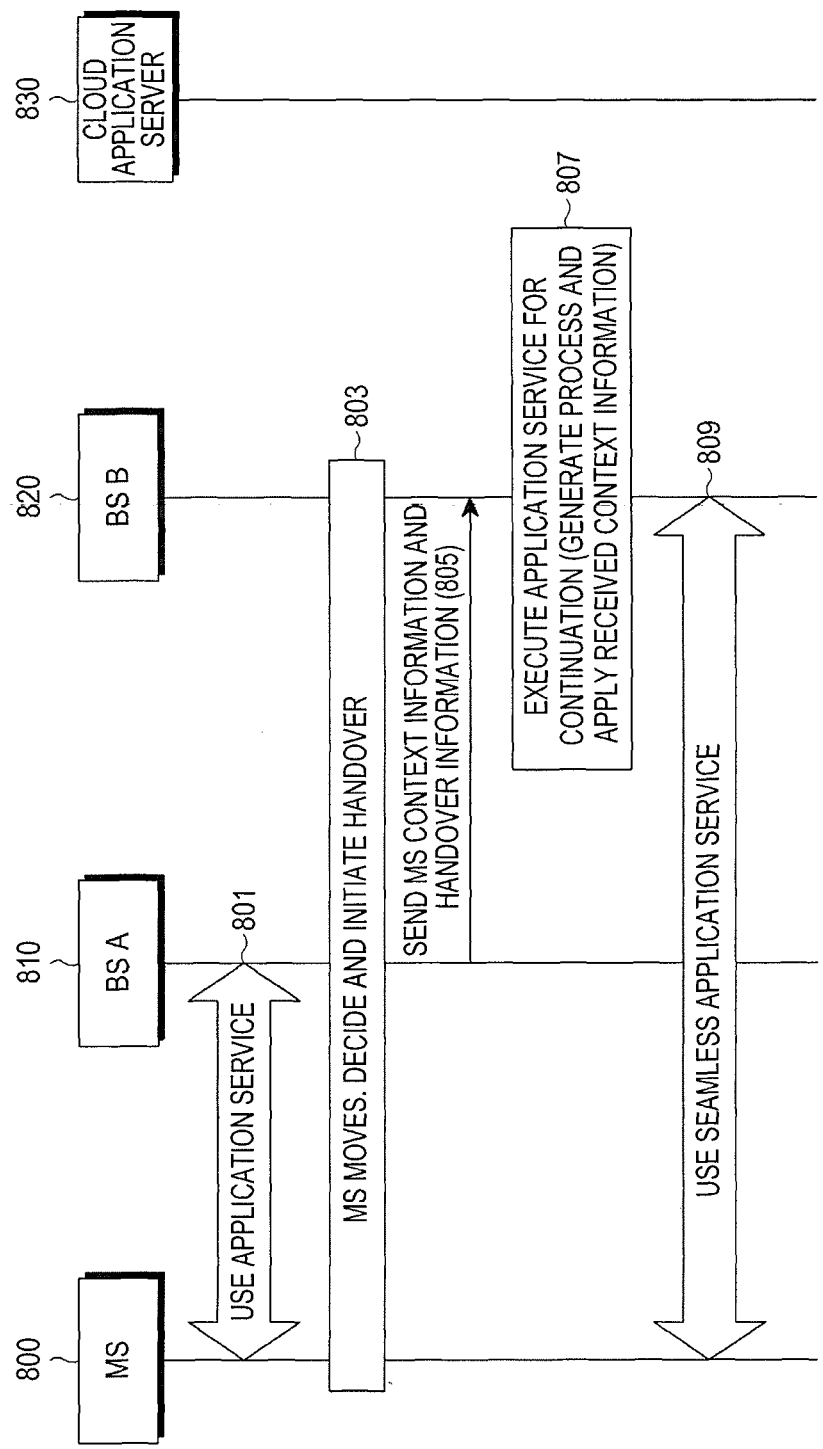
FIG. 8 is a diagram illustrating a signal flow for an operation for providing a service by transmitting context information between Base Stations (BSs) during handover of an MS in the mobile communication system according to an embodiment of the present invention.

With reference to FIG. 8, a description will be given of an operation for providing a service by transmitting context information between BSs during handover of an MS in the mobile communication system according to an embodiment of the present invention.

FIG. 8 is a diagram illustrating a signal flow for an operation for providing a service by transmitting context information between BSs during handover of an MS in the mobile communication system according to an embodiment of the present invention.

Referring to FIG. 8, an MS 800 uses an application service received from a BS 810 (BS A) acting as a serving BS in step 801.

When the MS 800 moves from the service area of BS A to the service area of a BS 820 (BS B), BS A decides on handover of the MS 800 to BS B and initiates a handover operation in step 803.

BS A stores traffic and messages related to the application service, generated so far from the MS 800 as context information about the MS 800. In step 805, BS A transmits the context information about the MS 800 to BS B.

That is, BS A provides BS B with the context information about the MS 800, so that the MS 800 may use the application service continuously even during movement.

Then BS B generates an application service instance for the MS 800 and executes the application service using the received context information about the MS 800 in step 807. BS A or BS B may transmit information about BS B to a cloud application server 830. Thus, the MS 800 can continuously receive and use the same application service as previously received from BS A, from BS B in step 809.

In the illustrated case of FIG. 8, an application service handover operation can be performed fast and simply through transmission and reception of context information between BSs, without transmission of context information about the MS 800 to the cloud application server 830 as illustrated in FIG. 7.

Meanwhile, an MS can continuously use an application service in the following method, without transmission and reception of context information about the MS as illustrated in FIGS. 7 and 8.

Figure 9:
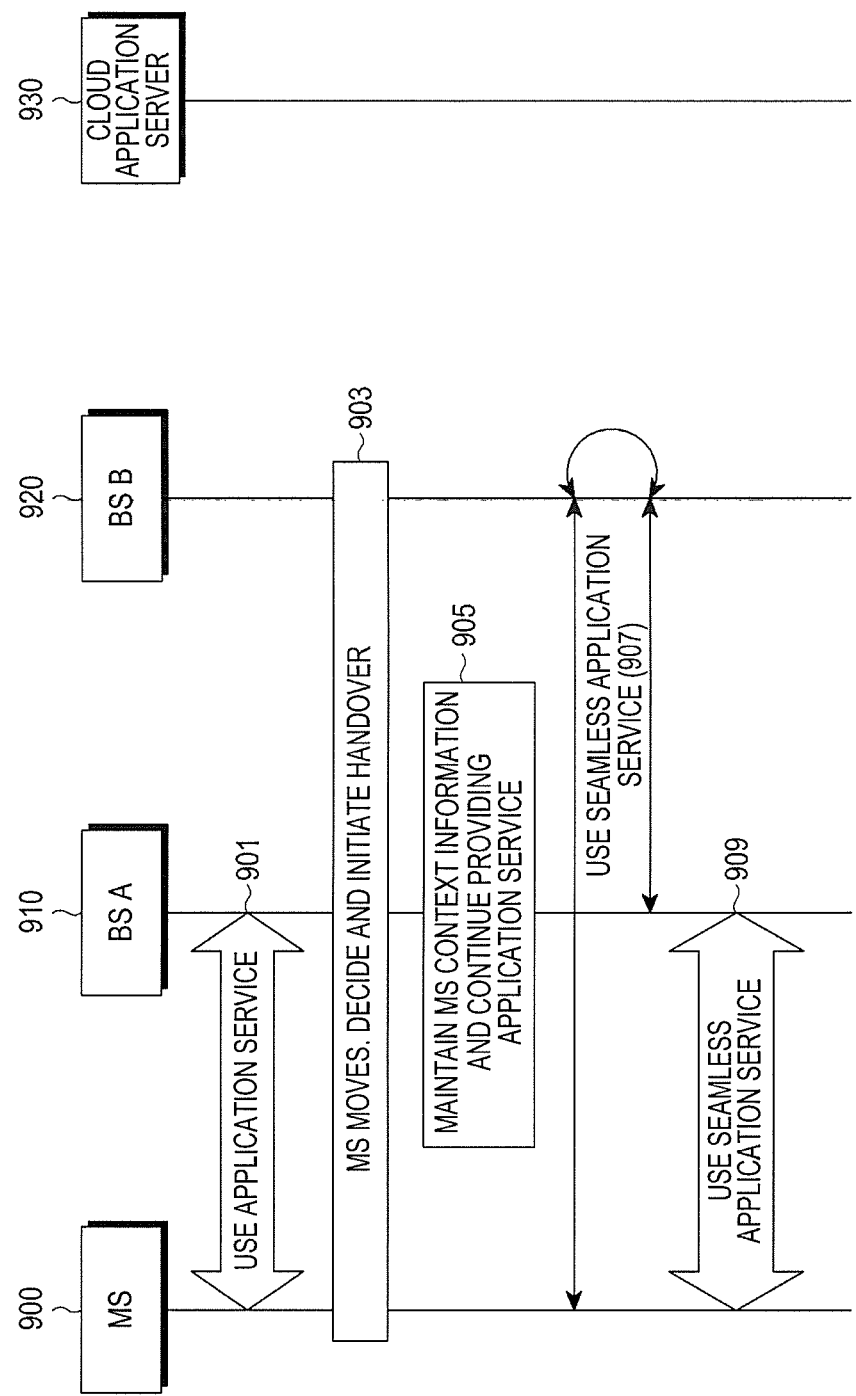
FIG. 9 is a diagram illustrating a signal flow for an operation for providing a service without transmitting and receiving context information during handover of an MS in the mobile communication system according to an embodiment of the present invention.

With reference to FIG. 9, a description will be given of an operation for providing a service without transmitting and receiving context information during handover of an MS in the mobile communication system according to an embodiment of the present invention.

FIG. 9 is a diagram illustrating a signal flow for an operation for providing a service without transmitting and receiving context information during handover of an MS in the mobile communication system according to an embodiment of the present invention.

Referring to FIG. 9, an MS 900 uses an application services received from a BS 910 (BS A) acting as a serving BS in step 901.

When the MS 900 moves from the service area of BS A to the service area of a BS 920 (BS B), BS A decides on handover of the MS 900 to BS B and initiates a handover operation in step 903.

BS A may request BS B to relay data received from the MS 900 during handover. On the other hand, BS A may request BS B to relay data received from the MS 900 even after the handover to BS B is completed.

BS A continues to maintain and manage context information about the MS 900 in step 905. In addition, BS A continuously provides the application service to the MS 900.

In step 907, the MS 900 and BS A may transmit and receive data related to the application service through BS B. That is, when BS A transmits data for providing the application service to BS B, BS B transmits the received data to the MS 900. When BS B receives traffic or a message form the MS 900, BS B transmits the received traffic or message to BS A.

In step 903, BS B relays between the MS 900 and BS A only during the handover, upon request of BS A. In contrast, BS B may continue relaying even after the handover is completed. Herein, BS A or BS B may provide information about BS B to a cloud application server 930.

Therefore, the MS 900 can continuously receive and use the same application services as previously received from BS A, from BS B in step 909.

Figure 10:
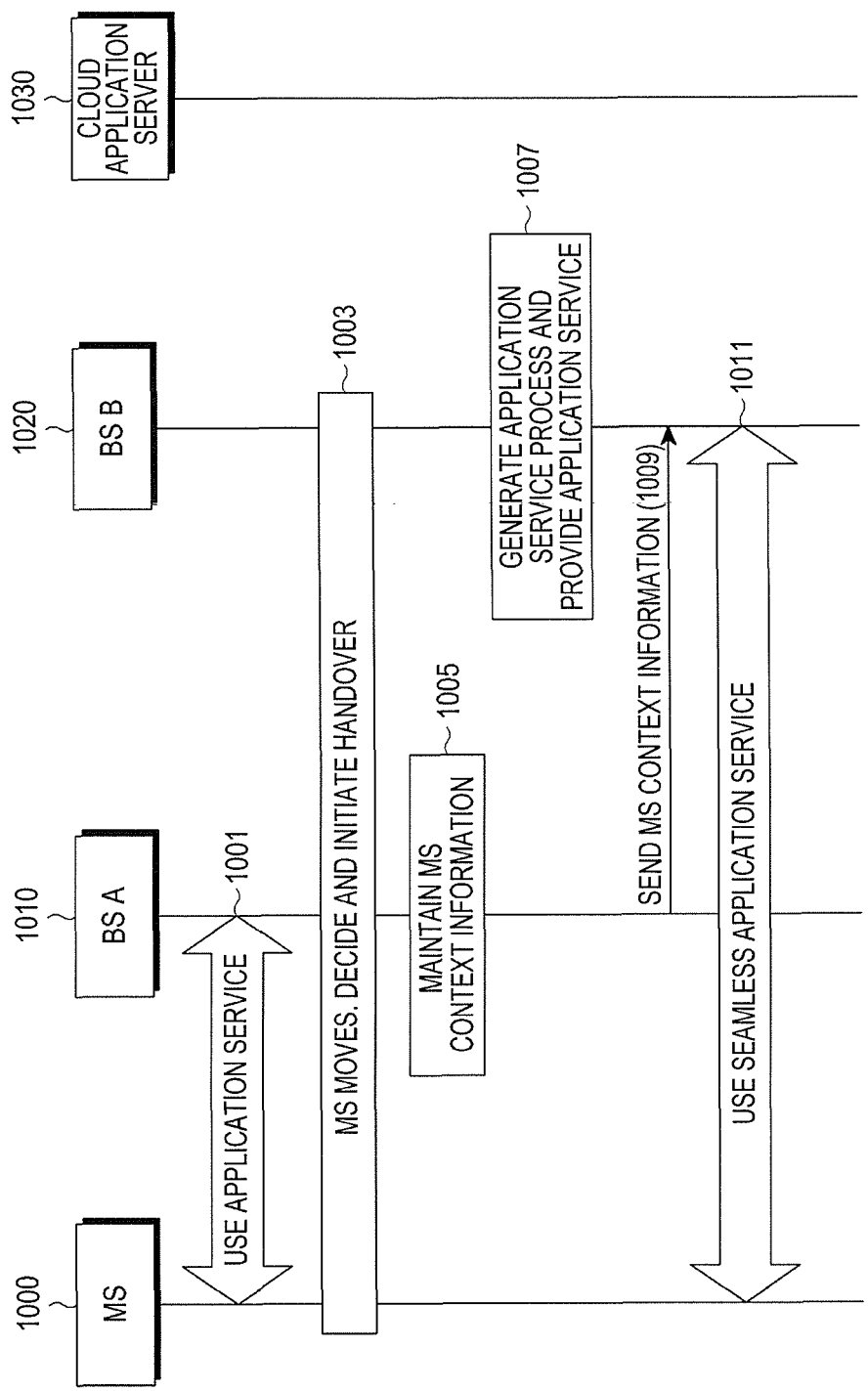
FIG. 10 is a diagram illustrating a signal flow for an operation for providing a service by application service handover in the mobile communication system according to an embodiment of the present invention.

With reference to FIG. 10, a description will be given of an operation for providing a service by application service handover in the mobile communication system according to an embodiment of the present invention.

FIG. 10 is a diagram illustrating a signal flow for an operation for providing a service by application service handover in the mobile communication system according to an embodiment of the present invention.

Referring to FIG. 10, an MS 1000 uses an application service received from a BS 1010 (BS A) acting as a serving BS in step 1001.

When the MS 1000 moves from the service area of BS A to the service area of a BS 1020 (BS B), BS A decides on handover of the MS 1000 to BS B and initiates a handover operation in step 1003.

BS A stores and manages traffic and messages related to the application service, generated so far from the MS 1000 as context information about the MS 1000 in step 1005.

In step 1007, BS B generates an application service process and provides the application service to MSs within its service area. That is, as the MS 1000 moves to the service area of BS B, BS A transmits the managed context information about the MS 1000 to BS B so that the MS 1000 may receive the application service from BS B in step 1009.

Then BS B executes the application service for the MS 1000 using the received context information about the MS 1000. Thus, the MS 1000 can continuously receive and use the same application service as previously received from BS A, from BS B in step 1011.

As described before, even though an MS moves, it can receive an application service continuously through a BS operation in the embodiment of the present invention.

4. Location-Based Access Control

In accordance with an embodiment of the present invention, location-based access control refers to a method in which a BS located within a predetermined area allows an MS to use a predetermined service or view predetermined content or prohibits the MS from using the predetermined service or viewing predetermined content depending on whether the MS has moved to the predetermined area.

For example, when the MS enters a conference room in a company, the BS may allow the MS to read a confidential document needed for a conference. If the MS moves out of the conference room, the BS may prohibit the MS from reading the confidential document. In this manner, a security service may be implemented.

Figure 11:
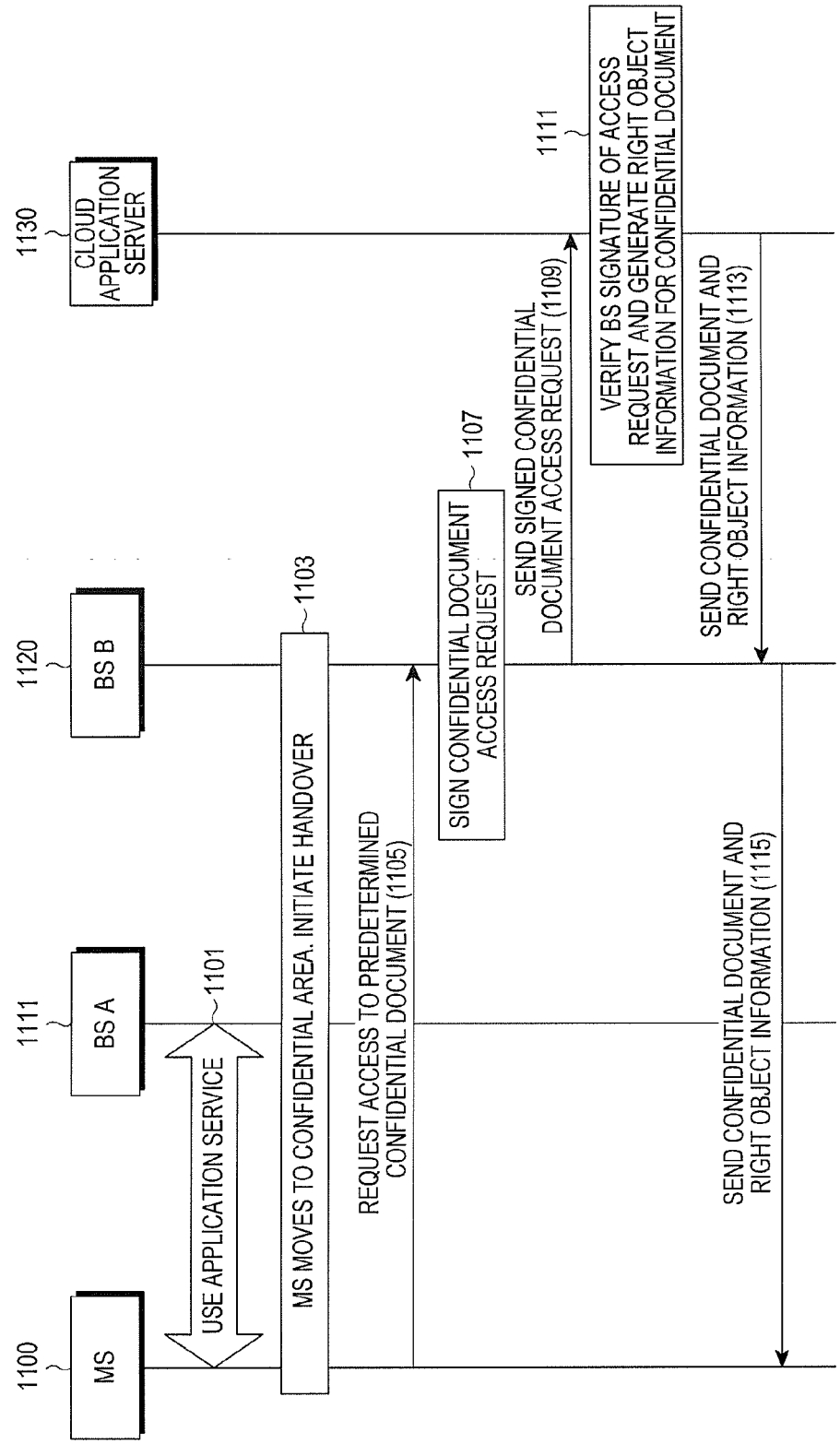
FIG. 11 is a diagram illustrating a signal flow for an MS location-based access control operation in the mobile communication system according to an embodiment of the present invention.

With reference to FIG. 11, an access control operation based on the location of an MS in the mobile communication system according to an embodiment of the present invention will be described below.

FIG. 11 is a diagram illustrating a signal flow for an access control operation based on the location of an MS in the mobile communication system according to an embodiment of the present invention.

Referring to FIG. 11, an MS 1100 uses an application service received from a BS 1111 (BS A) acting as a serving BS in step 1101. Since BS A manages a public service area, the MS 1100 can receive a public application service available to all MSs.

In step 1103, when the MS 1100 moves from the service area of BS A to the service area of a BS 1120 (BS B), BS A decides on handover of the MS 1100 to BS B and initiates a handover operation.

Since the service area of BS B is a confidential area, when the MS 1000 is outside the confidential area (e.g. when the MS 1000 is within the service area of BS A), the MS 1000 is not authorized to access a specific file stored in a cloud application server 1130.

However, if the MS 1000 moves to the service area of BS B, it can be authorized to access a confidential document in the following manner.

When the MS 1100 needs to access a specific confidential document after entering the confidential area, the MS 1100 requests access to the specific confidential document to BS B in step 1105.

Upon receipt of the access request from the MS 1100, BS B performs an authentication procedure with the cloud confidential document server 1130. In the authentication procedure, it is verified whether BS B is authorized to receive the confidential document from the cloud confidential document server 1130.

If the authentication is successful, BS B signs the confidential document access request in step 1107 and transmits the signed confidential document access request to the cloud confidential document server 1130 in step 1109.

Specifically, BS B generates a ticket (e.g. a confidential document access request message) that enables the MS 1100 to access the cloud confidential document server 1130 and electronically signs the ticket using its unique private key. Then BS B transmits the confidential document access request for the MS 1100 by transmitting the signed ticket to the cloud confidential document server 1130.

The cloud confidential document server 1130 verifies whether the BS signature of the confidential document access request is the signature of a BS within the confidential area in step 1111. If the signature is from a BS within the confidential area, the cloud confidential document server 1130 generates right object information for the confidential document.

The right object information is information needed to view a confidential document, including Digital Rights Management (DRM) information, a valid duration, and BS information. The right object information is used as a key with which the MS 1000 views the confidential document.

Thus, the cloud confidential document server 1130 transmits the right object information along with the confidential document to BS B in step 1113. BS B transmits the received confidential document and right object information to the MS 1100.

As a consequence, the MS 1100 can view the confidential document using the right object information.

5. Provisioning of Open API

In accordance with an embodiment of the present invention, a BS provides an open API so that a third party other than a BS manufacturer may develop an application service within the BS. That is, the BS allows sharing of an API that can be operated using resources of the BS, for use in developing an application program. In addition, the BS may provide an open API that enables an external server to provide a mash-up service using information within the BS.

As described before, since a BS takes over a function from a conventional application server, traffic and resources concentrated on the application server can be distributed in the embodiment of the present invention. In addition, an MS can use a seamless application service even during movement and even a low-specification MS can receive a high-quality service. As a security service and various services based on an open API are provided, many useful application services can be used in a mobile communication system.

The invention claimed is:

1. A method for providing an application service at a base station (BS) in a mobile communication system, the method comprising:
   receiving, by the BS, an application service request from a Mobile Station (MS);
   determining, by the BS, whether a requested application service corresponding to the application service request is executable in the MS using context information of the MS stored in the BS;
   creating, by the BS, a virtual terminal capable of executing the requested application service in the BS if the requested application service is not executable in the MS;
   receiving, by the BS, an application program execution file and data associated with the requested application service from an application server;
   executing, by the BS, the requested application service at the virtual terminal using the received application program execution file;
   transmitting, by the BS, data associated with the executed application service to the MS via the virtual terminal; and
   in response to identifying a decision for the MS to perform a handover to another BS, transmitting, by the BS, the context information to support the executed application service at the other BS after the handover.

2. The method of claim 1, further comprising:
   requesting verifying, by the BS, to verify whether the MS is authorized to receive the requested application service from the application server using the context information of the MS stored in the BS; and
   activating, by the BS, the virtual terminal if the MS is authorized to receive the requested application service from the application server.

3. The method of claim 1, wherein the virtual terminal operates based on an input from the MS.

4. The method of claim 1, wherein the BS transmits the context information for supporting the executed application service to the other BS.

5. The method of claim 1, wherein the BS transmits the context information for supporting the executed application service to the application server.

6. An apparatus configured to provide an application service in a mobile communication system, the apparatus comprising:
   a Radio Frequency (RF) unit configured to communicate with a Mobile Station (MS);
   a network unit configured to communicate with an application server in a network;
   a memory unit configured to store application service information and context information of the MS; and
   a controller configured to:
      receive an application service request from the MS using the context information of the MS,
      determine whether a requested application service corresponding to the application service request is executable in the MS,
      create a virtual terminal capable of executing the requested application service in the apparatus if the requested application service is not executable in the MS,
      receive an application program execution file and data associated with the requested application service from an application server,
      execute the requested application service at the virtual terminal using the received application program execution file,
      transmit data associated with the executed application service to the MS via the virtual terminal, and
      in response to identifying a decision for the MS to perform a handover to another base station (BS), transmit the context information to support the executed application service at the other BS after the handover.

7. The apparatus of claim 6, wherein the controller is further configured to request to verify whether the MS is authorized to receive the requested application service from the application server using the context information of the MS and activate the virtual terminal if the MS is authorized to receive the requested application service from the application server.

8. The apparatus of claim 6, wherein the virtual terminal operates based on an input from the MS.

9. The apparatus of claim 6, wherein the controller is further configured to transmit the context information for supporting the executed application service to the other BS.

10. The apparatus of claim 6, wherein the controller is further configured to transmit the context information for supporting the executed application service to the application server.

* * * * *